US011335964B2

United States Patent
Fang et al.

(10) Patent No.: US 11,335,964 B2
(45) Date of Patent: May 17, 2022

(54) BATTERY MODULE AND COLD PLATE THEREOF

(71) Applicant: National Chung-Shan Institute of Science and Technology, Taoyuan (TW)

(72) Inventors: Fu-Min Fang, Taoyuan (TW); Kuo-Kuang Jen, Taoyuan (TW); Gwo-Huei You, Taoyuan (TW); Kuo-An Liang, Taoyuan (TW)

(73) Assignee: National Chung-Shan Institute of Science and Technology, Taoyuan (TW)

(*) Notice: Subject to any disclaimer, the term of this patent is extended or adjusted under 35 U.S.C. 154(b) by 375 days.

(21) Appl. No.: 16/702,563

(22) Filed: Dec. 4, 2019

(65) Prior Publication Data

US 2021/0175561 A1 Jun. 10, 2021

(51) Int. Cl.
*H01M 10/6551* (2014.01)
*H01M 10/613* (2014.01)
*H01M 10/6554* (2014.01)
*H01M 10/6567* (2014.01)

(52) U.S. Cl.
CPC ..... *H01M 10/6551* (2015.04); *H01M 10/613* (2015.04); *H01M 10/6554* (2015.04); *H01M 10/6567* (2015.04)

(58) Field of Classification Search
CPC ........... H01M 10/6551; H01M 10/613; H01M 10/6554; H01M 10/6567; H01M 50/204; Y02E 60/10
See application file for complete search history.

(56) References Cited

U.S. PATENT DOCUMENTS

| | | | |
|---|---|---|---|
| 2002/0174980 A1* | 11/2002 | DiBene, II | H01L 23/3672 165/185 |
| 2009/0145581 A1* | 6/2009 | Hoffman | H01L 23/473 165/80.3 |
| 2011/0117410 A1* | 5/2011 | Yoon | H01M 10/647 429/120 |
| 2013/0154081 A1* | 6/2013 | Kadoguchi | H01L 23/473 257/712 |
| 2016/0021784 A1* | 1/2016 | Choi | H05K 7/20927 165/80.4 |

(Continued)

FOREIGN PATENT DOCUMENTS

| | | |
|---|---|---|
| JP | 2002-56904 A | 2/2002 |
| JP | 2003-163036 A | 6/2003 |
| JP | 2012-216360 A | 11/2012 |

*Primary Examiner* — Muhammad S Siddiquee
(74) *Attorney, Agent, or Firm* — Winston Hsu

(57) ABSTRACT

A cold plate for a battery module comprising a plurality of cells that produces heat as charging and discharging is disclosed. The cold plate includes a plurality of first fins distributed in a first subarea of the cold plate; and a plurality of second fins distributed in a second subarea of the cold plate; wherein a second fin coverage of the plurality of second fins distributed in the second subarea is smaller than a first fin coverage of the plurality of first fins distributed in the first subarea when an amount of heat absorption of the second subarea from the plurality of cells is greater than an amount of heat absorption of the first subarea from the plurality of cells.

20 Claims, 7 Drawing Sheets

(56) References Cited

U.S. PATENT DOCUMENTS

2016/0088770 A1* 3/2016 Okuaki ................ H01L 23/367
  165/80.3
2020/0025466 A1* 1/2020 Nakano ............... H01L 21/4882
2021/0127524 A1* 4/2021 Ahmadi ................ H01S 3/0405

* cited by examiner

BATTERY MODULE AND COLD PLATE THEREOF

BACKGROUND OF THE INVENTION

1. Field of the Invention

The present invention relates to a battery module and cold plate thereof, and more particularly, to a battery module and cold plate thereof in which a density of fins formed in the cold plate is determined based on emitted heat of the battery module.

2. Description of the Prior Art

Vehicles may derive electric power from multiple individual battery cells packaged into a battery module. The battery module may contain the multiple individual cells within a generally rectangular housing. As the individual cells are charged and discharged, they may generate heat due to Joule heating caused by current flowing through the internal resistance of the cells. In addition, the individual cells may be subjected to heating via exothermic chemical reactions occurring within the cells. Increased temperatures may increase the rate of chemical reactions, cause physical distortion (e.g., swelling, short circuits, open circuits), and thus may prematurely age the cells and the battery module. Accordingly, it would be desirable to provide an effective cooling system with a large cooling surface to contact the housing of the module and draw excess heat away from the battery module, thereby preserving the cells and the battery module.

SUMMARY OF THE INVENTION

It is therefore an objective of the present invention to provide a battery module and cold plate thereof capable of cooling to preserve the battery module and the cell.

The present invention discloses a cold plate for a battery module comprising a plurality of cells that produces heat as charging and discharging. The cold plate includes a plurality of first fins distributed in a first subarea of the cold plate; and a plurality of second fins distributed in a second subarea of the cold plate; wherein a second fin coverage of the plurality of second fins distributed in the second subarea is smaller than a first fin coverage of the plurality of first fins distributed in the first subarea when an amount of heat absorption of the second subarea from the plurality of cells is greater than an amount of heat absorption of the first subarea from the plurality of cells.

The present invention further discloses a battery module including a housing; a plurality of cells contained in the housing, wherein the plurality of cells produces heat as charging and discharging; a plurality of busbars, wherein one of the plurality of busbars is configured to connect a cathode of one of the plurality of cells to an anode of another of the plurality of cells; and a cold plate placed on the plurality of busbars. The cold plate includes a plurality of first fins distributed in a first subarea of the cold plate; and a plurality of second fins distributed in a second subarea of the cold plate; wherein a second fin coverage of the plurality of second fins distributed in the second subarea is smaller than a first fin coverage of the plurality of first fins distributed in the first subarea when an amount of heat absorption of the second subarea from the plurality of cells is greater than an amount of heat absorption of the first subarea from the plurality of cells.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
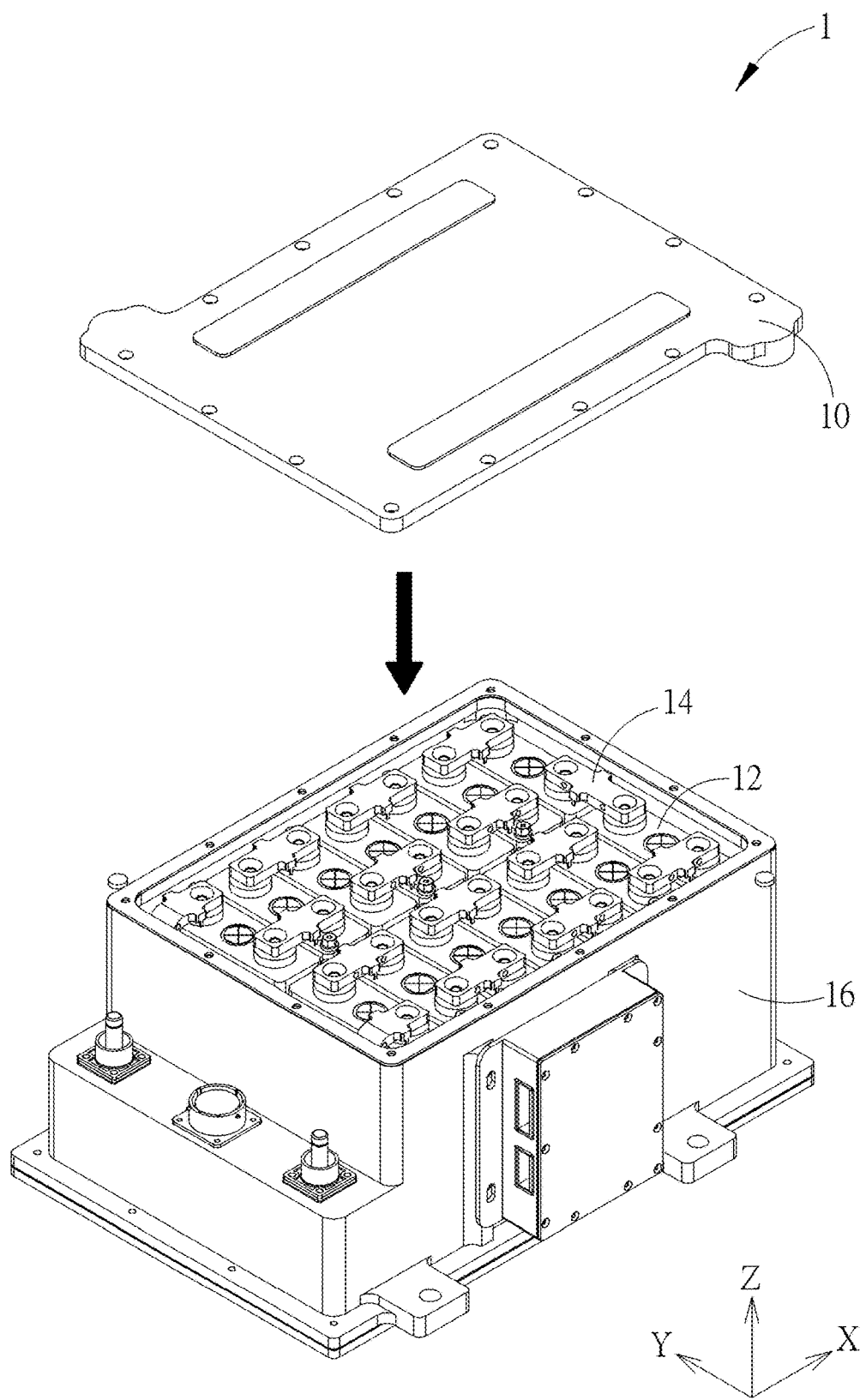
FIG. 1 illustrates a perspective view of a battery module according to an embodiment of the present invention.

FIG. 1 illustrates a perspective view of a battery module 1 according to an embodiment of the present invention. The battery module 1 includes a cold plate 10, a plurality of cells 12, a plurality of busbars 14, and a housing 16. The battery module 1 may be utilized in a vehicle or any device that requires battery power source. The housing 16 has a cuboid shape and is configured to contain the plurality of cells 12. Each of the plurality of cells 12 is connected in series by the plurality of busbars 14; for example, one busbar 14 connects a cathode of one cell 12 and an anode of another cell 12. The plurality of busbars 14 are placed at top of the plurality of cells 12, wherein Ohmic heat may be generated due to current flowing through the internal resistance of the plurality of cells 12 as the plurality of cells 12 are charging and discharging, and the Ohmic heat is dissipated to the plurality of busbars 14 to make them heating.

The cold plate 10 is used for cooling the plurality of busbars 14 when the cold plate 10 is placed on top surfaces of the plurality of busbars 14. For example, the Ohmic heat flowed to the plurality of busbars 14 is dissipated to circulating fluid coolant contained in the cold plate 10. Therefore, the cold plate 10 protects the battery module 1 from overheat.

Figure 2:
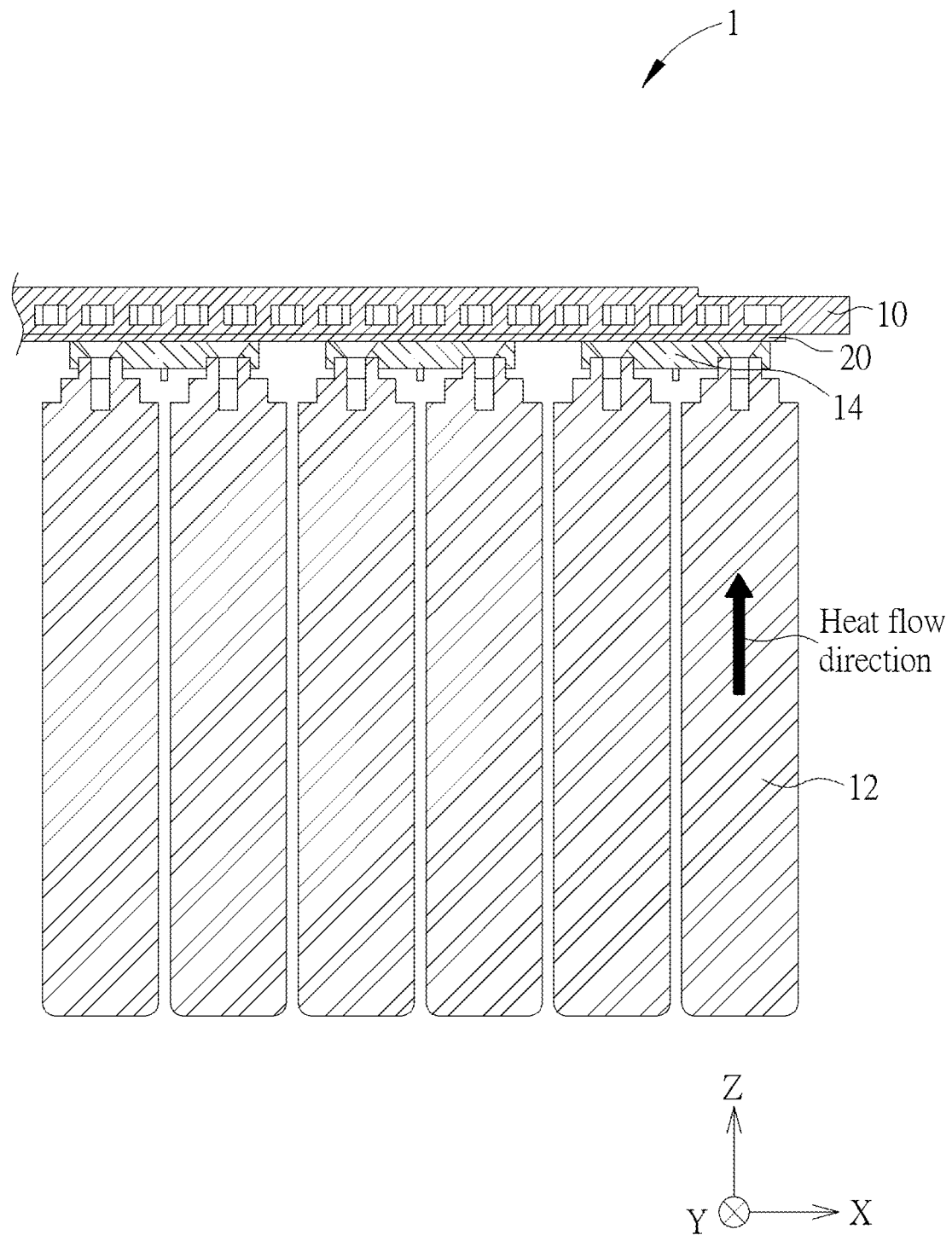
FIG. 2 illustrates a sectional view of the battery module in FIG. 1 according to an embodiment of the present invention.

FIG. 2 illustrates a sectional view of the battery module 1. As the plurality of cells 12 are charging and discharging, Ohmic heat is generated in the plurality of cells 12 and flows upward to the plurality of busbars 14.

In one embodiment, the plurality of busbars 14 may be made of copper, and the cold plate 10 may be made of heat dissipation materials such as aluminum. In order to avoid the aluminum cold plate 10 from short-circuited with the copper busbars 14, the cold plate 10 may be processed by an anodic oxide coating treatment to coat an insulate film on the surface of the aluminum cold plate 10 before the cold plate 10 is assembled into the battery module 1. In this embodiment, as shown in FIG. 2, a thermal conductive silicone pad 20 is placed between the cold plate 10 and the plurality of busbars 14 to provide insulation as well as heat dissipation.

Figure 3:
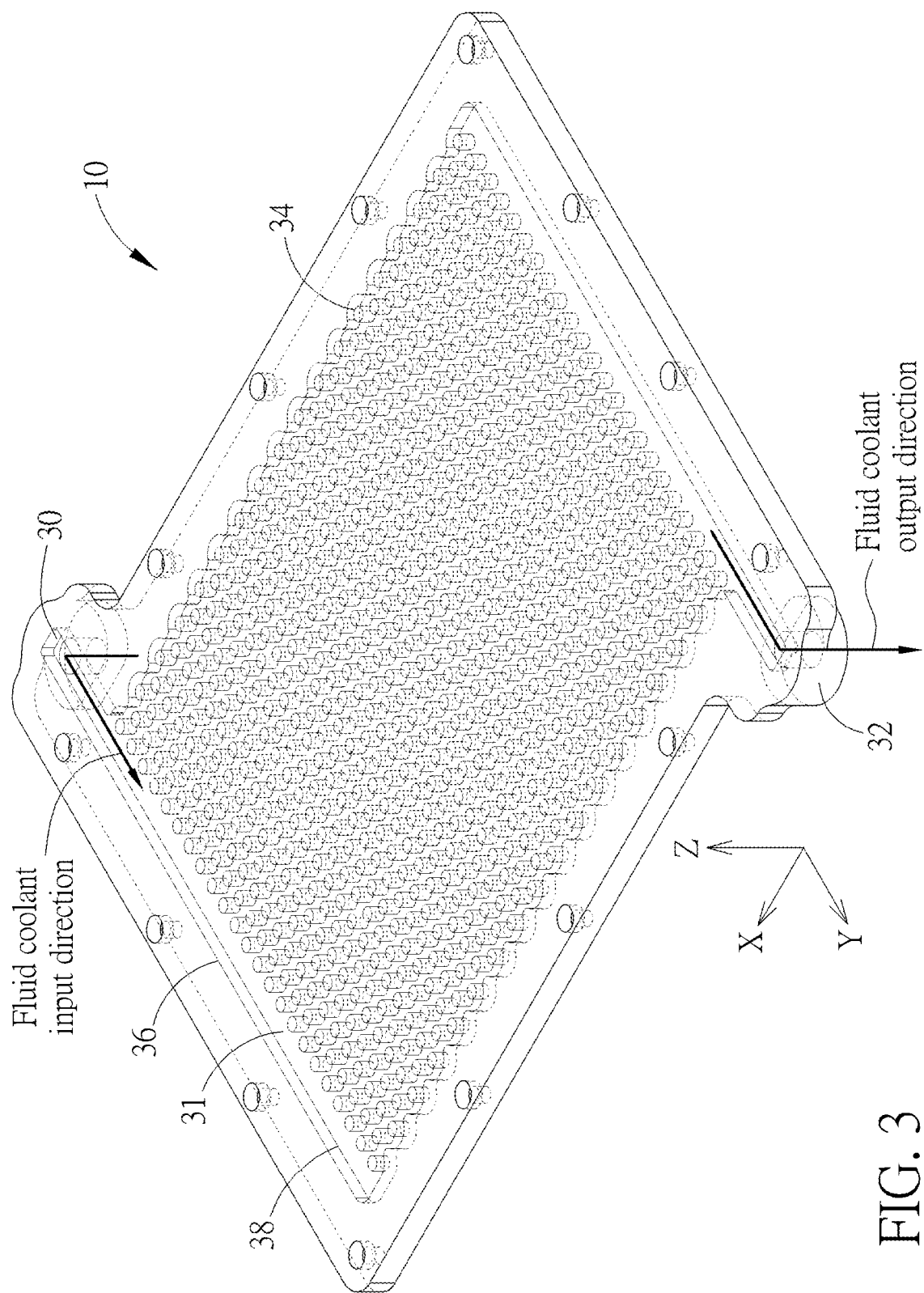
FIG. 3 illustrates a perspective view of a cold plate according to an embodiment of the present invention.

FIG. 3 illustrates a perspective view of the cold plate 10. The cold plate 10 includes an inlet header 30, an outlet header 32, a plurality of fins 34, a top plane 36 and a bottom plane 38, wherein a fluid space 31 is formed between the top plane 36 and the bottom plane 38.

The inlet header 30 is configured to receive a fluid coolant, the fluid space 31 is configured to contain the fluid coolant, and the outlet header 32 is configured to output the fluid coolant. The top plane 36 and the bottom plane 38 may have a rectangular shape, and the inlet header 30 and the outlet header 32 may be located at diagonal vertices of the rectangular top plane 36 (or the bottom plane 38), which is not limited. The top plane 36 and the bottom plane 38 are parallel to an XY plane. The plurality of fins 34 extend along a Z direction perpendicular to the XY plane, and are connected between the top plane 36 and the bottom plane 38. In one embodiment, each of the plurality of fins 34 has a cylinder shape.

The fluid coolant circularly flows in the cold plate 10 to absorb heat from the cold plate 10. Specifically, the fluid coolant is inputted to the inlet header 30, flows in the fluid space 31 to absorb heat, outputs from the outlet header 32 to dissipate absorbed heat from the cold plate 10, then the fluid coolant is inputted into the inlet header 30 again, and so forth. In one embodiment, the fluid coolant may be water or a mixture of water and ethylene glycol, which is not limited.

Figure 4:
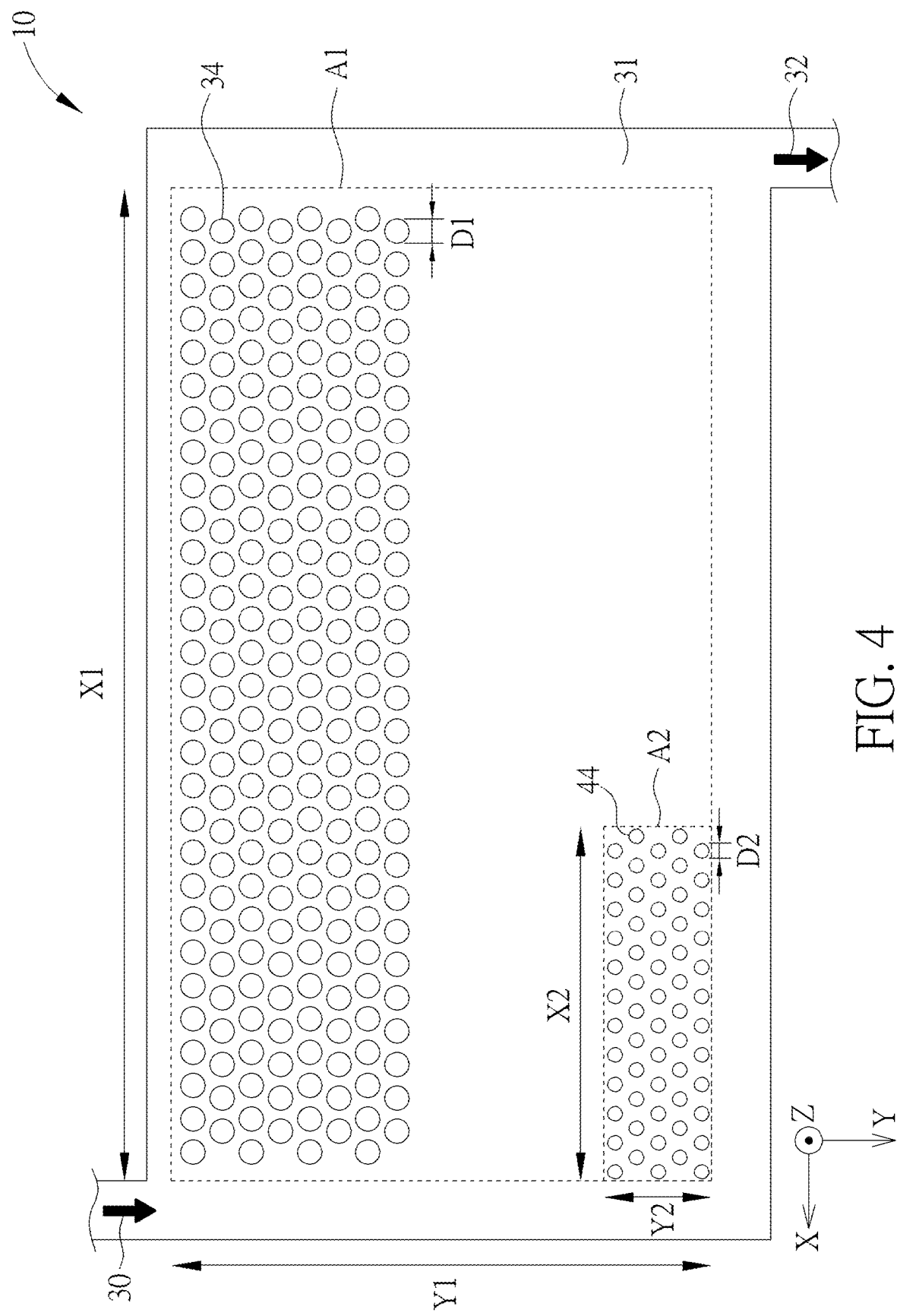
FIG. 4 illustrates a top view of a cold plate.

FIG. 4 illustrates a top view of the cold plate 10. The plurality of fins 34 is uniformly distributed in an area A1 of the cold plate 10. Given that a length X1 and a width Y1 form the area A1, a diameter of each fin 34 in the area A1 is D1, and a number of the plurality of fins 34 in the area A1 is N1, then a first fin coverage FCV1 of the area A1 and a contact area CA1 of the plurality of fins 34 in the area A1 are denoted as follows.

$$\text{Fin coverage of area } A1 = FCV1 = \frac{N1 \times \left(\frac{D1}{2}\right)^2 \times \pi}{X1 \times Y1}$$

$$\text{Contact area of } N1 \text{ in area } A1 = CA1 = N1 \times D1 \times \pi \times Z1$$

Wherein, the first fin coverage FCV1 refers to a total (top or bottom) circle area of the plurality of fins 34 in the area A1 divided by the area A1, the contact area CA1 refers to a total rectangle area (lateral surface area of a cylinder) of the plurality of fins 34 in the area A1 along the Z direction perpendicular to the area A1, and Z1 is a height of each of the plurality of fins 34 along the Z direction.

However, applicant notices that the battery module 1 does not heat uniformly. In practice, it is found that there are specific subareas of the cold plate 10 that absorb much heat from the plurality of cells 12. For example, since the plurality of busbars 14 dissipate Ohmic heat from the plurality of cells 12, the subareas of the cold plate 10 contacting the plurality of busbars 14 may absorb more heat than subareas of the cold plate 10 not contacting with the plurality of busbars 14.

Given that a second subarea A2 of the cold plate 10 absorbs much heat from one of the plurality of busbars 14, and a number of the plurality of fins 44 in the second subarea A2 is N2. Given that a length X2 and a width Y2 form the second subarea A2, and a diameter of each fin 44 in the second subarea A2 is D2, then a second fin coverage of the second subarea A2 and a contact area of the plurality of fins 44 in the second subarea A2 are denoted as follows.

$$\text{Fin coverage of area } A2 = FCV2 = \frac{N2 \times \left(\frac{D2}{2}\right)^2 \times \pi}{X2 \times Y2}$$

$$\text{Contact area of } N2 \text{ in second subarea } A2 = CA2 = N2 \times D2 \times \pi \times Z1$$

Wherein, the second fin coverage FCV2 refers to a total (top or bottom) circle area of the plurality of fins 44 in the area A2 divided by the area A2, and the contact area CA2 refers to a total rectangle area of the plurality of fins 44 in the area A2 along the Z direction.

In order to facilitate heat dissipation at the second subarea A2 that absorbs much heat in the cold plate 10, based on hydromechanics, the fluidity at the second subarea A2 that absorbs much heat should be higher than the fluidity at the subarea that absorbs less heat. Specifically, the fluidity of the fluid coolant is higher when the fluid coolant encounters smaller fin coverage, while the fluidity of the fluid coolant is lower when the fluid coolant encounters greater fin coverage. Accordingly, the fin coverage of subareas in the cold plate 10 should be configured according to their amount of heat absorption; for example, the fin coverage should be negatively proportional to the amount of heat absorption. In one embodiment, the second fin coverage FCV2 of the second subarea A2 is smaller than the first fin coverage FCV1 of the area A1; for example, FCV2/FCV1<1. In one embodiment, FCV2/FCV1=0.625 or 0.5, which is not limited.

Further, in order to facilitate heat dissipation at the second subarea A2 that absorbs much heat in the cold plate 10, the fluid coolant absorbs much heat when the cold plate 10 provides a larger contact area; for example, the contact area is positively proportional to the amount of heat absorption. In one embodiment, the contact area CA2 at the second subarea A2 that absorbs much heat should be equal to or greater than the contact area CA1 at the area A1; for example, CA2/CA1=>1. From another point of view, the contact area CA2 at the second subarea A2 that absorbs much heat is not less than the contact area CA1 at the area A1.

In other words, the present invention configures the distributions of the fins in the subareas of the cold plate according to the amount of heat absorption. In one embodiment, the fin coverage is negatively proportional to the amount of heat absorption, and the contact area is positively proportional to the amount of heat absorption. Therefore, the present invention is able to facilitate heat dissipation at the subarea in the cold plate that absorbs much heat from the busbar and the cell of the battery module.

Figure 5:
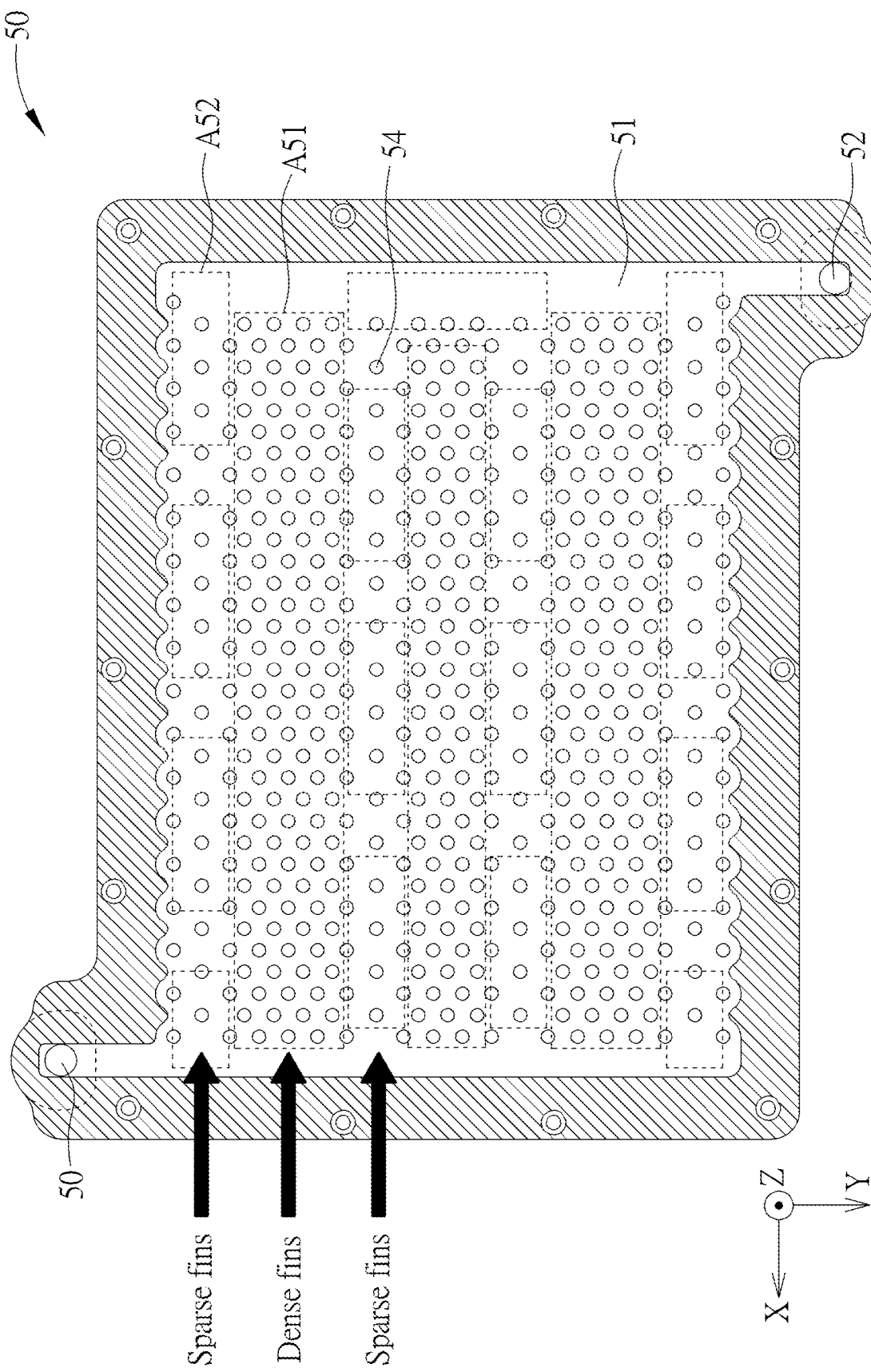
FIG. 5 illustrates a top view of a cold plate according to an embodiment of the present invention.

FIG. 5 illustrates a top view of a cold plate 50 according to an embodiment of the present invention. The cold plate 50 is configured to replace the cold plate 10 of the battery module 1 in FIG. 1. The cold plate 50 includes an inlet header 50, an outlet header 52, and a plurality of fins 54, wherein a fluid space 51 is formed in the cold plate 50. The cold plate 50 includes a plurality of first subareas A51 and a plurality of second subareas A52, wherein the amount of heat absorption of the second subarea A52 is greater than the amount of heat absorption of the first subarea A51 as the plurality of cells 12 of the battery module 1 is charging and discharging.

In one embodiment, projections of the plurality of second subareas A52 and the plurality of busbars 14 onto the XY plane are overlapped. In one embodiment, projections of the plurality of first subareas A51 and the plurality of busbars 14 onto the XY plane are not overlapped. As shown in FIG. 5, some of the plurality of fins 54 is sparsely distributed in each of the second subareas A52, and some of the plurality of fins 54 is densely distributed in each of the first subareas A51. In one embodiment, a fin coverage of the second subarea A52 is smaller than a fin coverage of the first subarea A51. In one embodiment, a contact area of the fins 54 distributed in the second subarea A52 is equal to or greater than a contact area of the fins 54 distributed in the first subarea A51. In one embodiment, each of the plurality of fins 54 has a cylinder shape and is connected between a top plane and a bottom plane of the cold plate 50.

Therefore, the fluidity at the second subarea A52 that absorbs much heat is higher than the fluidity at the first subarea A51 that absorbs less heat, which facilitates heat dissipation at the second subarea A52 that absorbs much heat from the busbar 14 and the cell 12 of the battery module 1.

Figure 6:
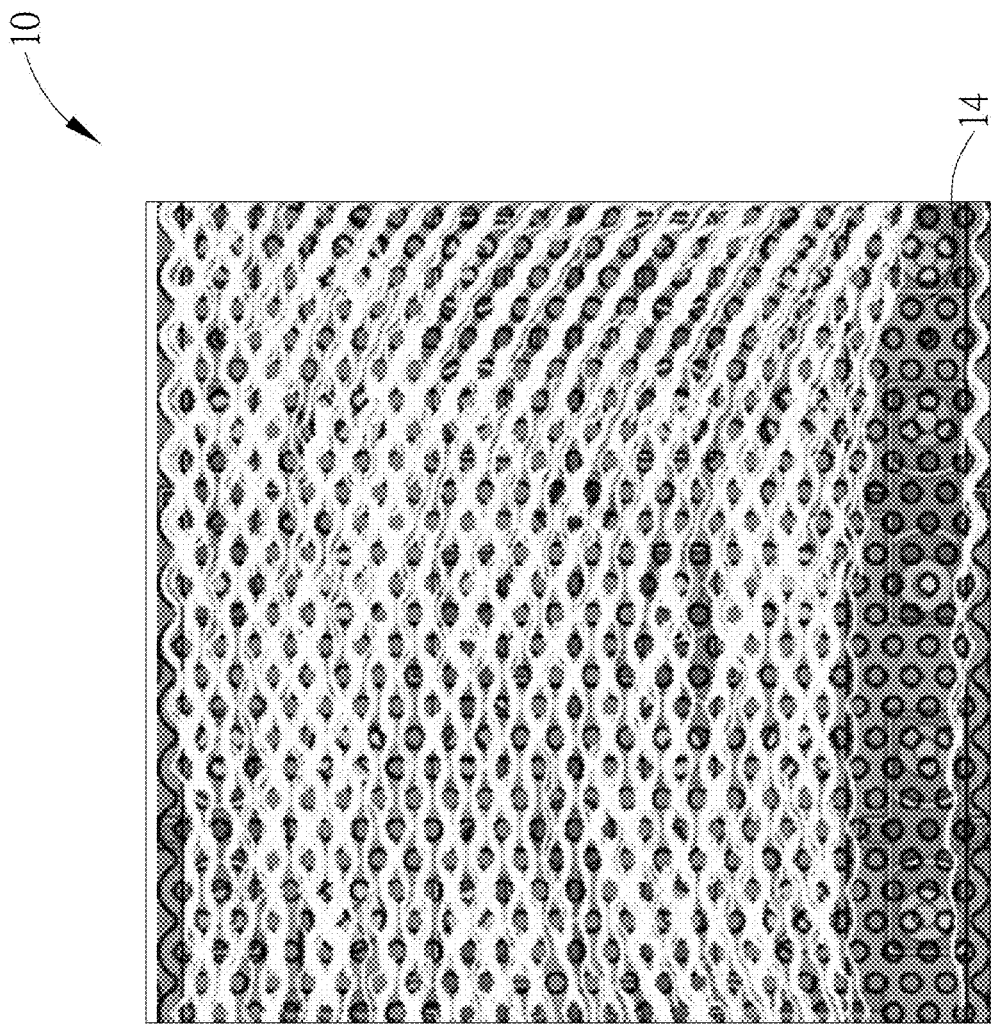
FIG. 6 illustrates a simulation of fluid coolant flowing in the cold plate in FIG. 3.
Figure 7:
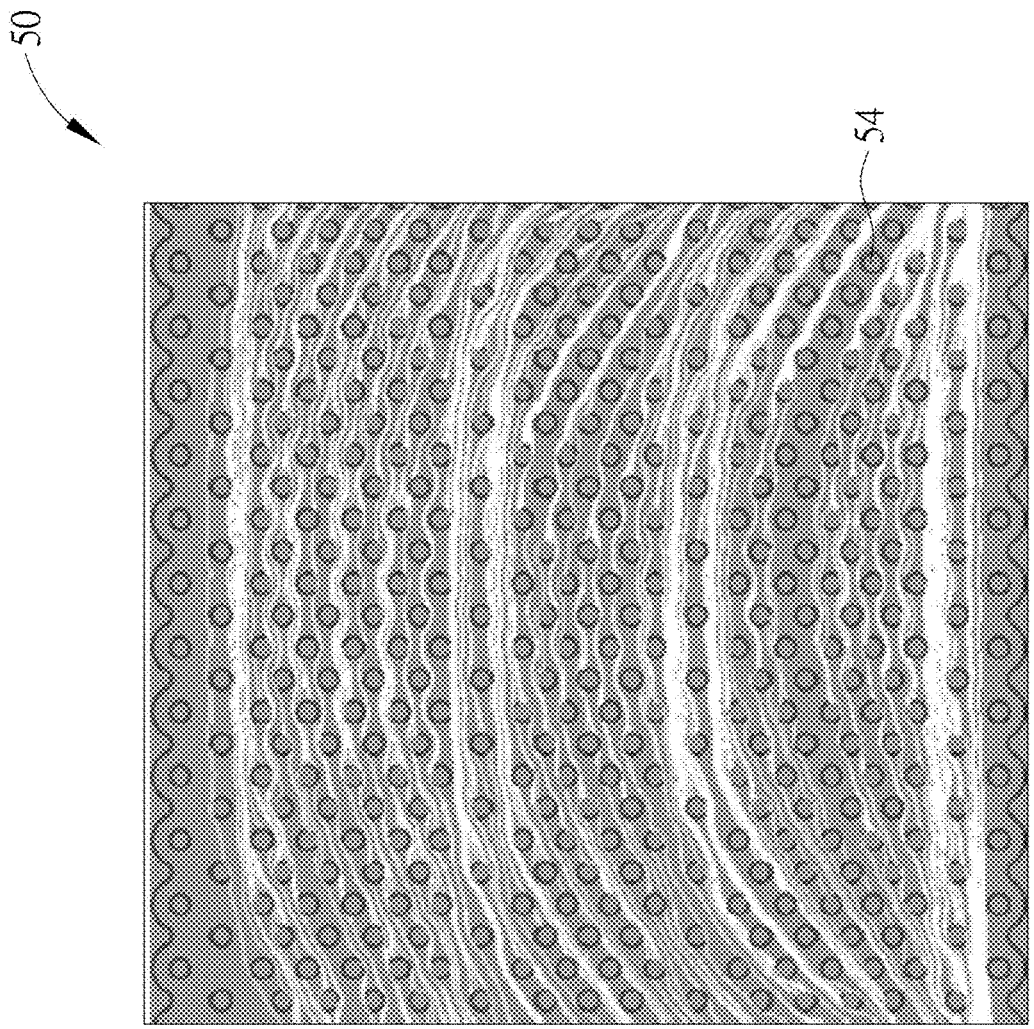
FIG. 7 illustrates a simulation of fluid coolant flowing in the cold plate in FIG. 5 according to an embodiment of the present invention.

FIG. 6 illustrates a simulation of fluid coolant flowing in the cold plate 10 in FIG. 3. FIG. 7 illustrates a simulation of fluid coolant flowing in the cold plate 50 in FIG. 5. The fluid coolant is white, and the cold plate 10 is grey in FIG. 6 and FIG. 7. Since the fins 14 of the cold plate 10 are uniformly distributed, the fluid coolant flows uniformly in the cold plate 10. In comparison, since the fins 54 of the cold plate 50 of the present invention are not uniformly distributed, there are much fluid coolant flowing to the second subarea A52 with sparse fins 54 and less fluid coolant flowing to the first subarea A51 with dense fins 54 in the cold plate 50 of the present invention. Therefore, the cold plate 50 of the present invention facilitates heat dissipation at the second subarea A52 that absorbs much heat from the busbar 14 and the cell 12 from the battery module 1.

To sum up, the present invention configures the distributions of the fins in the subareas of the cold plate according to the amount of heat absorption. In one embodiment, the fin coverage is negatively proportional to the amount of heat absorption, and the contact area is positively proportional to the amount of heat absorption. Therefore, the present invention is able to facilitate heat dissipation at the subarea in the cold plate that absorbs much heat from the busbar and the cell of the battery module.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A cold plate for a battery module comprising a plurality of cells that produces heat as charging and discharging, comprising:
    a plurality of first fins distributed in a first subarea of the cold plate; and
    a plurality of second fins distributed in a second subarea of the cold plate;
    wherein a second fin coverage of the plurality of second fins distributed in the second subarea is smaller than a first fin coverage of the plurality of first fins distributed in the first subarea when an amount of heat absorption of the second subarea from the plurality of cells is greater than an amount of heat absorption of the first subarea from the plurality of cells.

2. The cold plate of claim 1, wherein each of the plurality of first fins and the plurality of second fins has a cylinder shape, the second fin coverage refers to a total circle area of the plurality of second fins divided by an area of the second subarea, and the first fin coverage refers to a total circle area of the plurality of first fins divided by an area of the first subarea.

3. The cold plate of claim 2, wherein the first fin coverage is denoted as:

$$FCV1 = \frac{N1 \times \left(\frac{D1}{2}\right)^2 \times \pi}{X1 \times Y1}$$

wherein FCV1 is the first fin coverage, N1 is a number of the plurality of first fins distributed in the first subarea, D1 is a diameter of each of the plurality of first fins, X1 is a length of the first subarea, and Y1 is a width of the first subarea.

4. The cold plate of claim 2, wherein the second fin coverage is denoted as:

$$FCV2 = \frac{N2 \times \left(\frac{D2}{2}\right)^2 \times \pi}{X2 \times Y2}$$

wherein FCV2 is the second fin coverage, N2 is a number of the plurality of second fins distributed in the second subarea, D2 is a diameter of each of the plurality of second fins, X2 is a length of the second subarea, and Y2 is a width of the second subarea.

5. The cold plate of claim 1, wherein a second contact area of the plurality of second fins distributed in the second subarea is equal to or greater than a first contact area of the plurality of first fins distributed in the first subarea when the amount of heat absorption of the second subarea from the cell is greater than the amount of heat absorption of the first subarea from the cell.

6. The cold plate of claim 5, wherein each of the plurality of first fins and the plurality of second fins has a cylinder shape, the second contact area refers to a total rectangle area of the plurality of second fins along a direction perpendicular to the second subarea, and the first contact area refers to a total rectangle area of the plurality of first fins along the direction perpendicular to the first subarea.

7. The cold plate of claim 5, wherein the first contact area is denoted as:

$$CA1 = N1 \times D1 \times \pi \times Z1$$

wherein CA1 is the first contact area, N1 is a number of the plurality of first fins distributed in the first subarea, D1 is a diameter of each of the plurality of first fins, and Z1 is a height of each of the plurality of first fins.

8. The cold plate of claim 5, wherein the second contact area is denoted as:

$$CA2 = N2 \times D2 \times \pi \times Z1$$

wherein CA2 is the second contact area, N2 is a number of the plurality of second fins distributed in the second subarea, D2 is a diameter of each of the plurality of second fins, and Z1 is a height of each of the plurality of second fins.

9. The cold plate of claim 1, further comprising:
    an inlet header configured to receive a fluid coolant;
    a top plane;
    a bottom plane, wherein a fluid space is formed between the top plane and the bottom plane, and the fluid space is configured to contain the fluid coolant;

an outlet header configured to output the fluid coolant;
wherein the plurality of first fins and the plurality of second fins are connected between the top plane and the bottom plane.

10. The cold plate of claim 1, wherein the battery module comprises:
a plurality of busbars, wherein one of the plurality of busbars is configured to connect a cathode of one of the plurality of cells to an anode of another of the plurality of cells;
wherein projections of the second subarea and the plurality of busbars onto a plane are overlapped, and projections of the first subarea and the plurality of busbars onto the plane are not overlapped.

11. A battery module, comprising:
a housing;
a plurality of cells contained in the housing, wherein the plurality of cells produces heat as charging and discharging;
a plurality of busbars, wherein one of the plurality of busbars is configured to connect a cathode of one of the plurality of cells to an anode of another of the plurality of cells; and
a cold plate placed on the plurality of busbars, and comprising:
a plurality of first fins distributed in a first subarea of the cold plate; and
a plurality of second fins distributed in a second subarea of the cold plate;
wherein a second fin coverage of the plurality of second fins distributed in the second subarea is smaller than a first fin coverage of the plurality of first fins distributed in the first subarea when an amount of heat absorption of the second subarea from the plurality of cells is greater than an amount of heat absorption of the first subarea from the plurality of cells.

12. The battery module of claim 11, wherein each of the plurality of first fins and the plurality of second fins has a cylinder shape, the second fin coverage refers to a total circle area of the plurality of second fins divided by an area of the second subarea, and the first fin coverage refers to a total circle area of the plurality of first fins divided by an area of the first subarea.

13. The battery module of claim 12, wherein the first fin coverage is denoted as:

$$FCV1 = \frac{N1 \times \left(\frac{D1}{2}\right)^2 \times \pi}{X1 \times Y1}$$

wherein FCV1 is the first fin coverage, N1 is a number of the plurality of first fins distributed in the first subarea, D1 is a diameter of each of the plurality of first fins, X1 is a length of the first subarea, and Y1 is a width of the first subarea.

14. The battery module of claim 12, wherein the second fin coverage is denoted as:

$$FCV2 = \frac{N2 \times \left(\frac{D2}{2}\right)^2 \times \pi}{X2 \times Y2}$$

wherein FCV2 is the second fin coverage, N2 is a number of the plurality of second fins distributed in the second subarea, D2 is a diameter of each of the plurality of second fins, X2 is a length of the second subarea, and Y2 is a width of the second subarea.

15. The battery module of claim 11, wherein a second contact area of the plurality of second fins distributed in the second subarea is equal to or greater than a first contact area of the plurality of first fins distributed in the first subarea when the amount of heat absorption of the second subarea from the cell is greater than the amount of heat absorption of the first subarea from the cell.

16. The battery module of claim 15, wherein each of the plurality of first fins and the plurality of second fins has a cylinder shape, the second contact area refers to a total rectangle area of the plurality of second fins along a direction perpendicular to the second subarea, and the first contact area refers to a total rectangle area of the plurality of first fins along the direction perpendicular to the first subarea.

17. The battery module of claim 15, wherein the first contact area is denoted as:

$$CA1 = N1 \times D1 \times \pi \times Z1$$

wherein CA1 is the first contact area, N1 is a number of the plurality of first fins distributed in the first subarea, D1 is a diameter of each of the plurality of first fins, and Z1 is a height of each of the plurality of first fins.

18. The battery module of claim 15, wherein the second contact area is denoted as:

$$CA2 = N2 \times D2 \times \pi \times Z1$$

wherein CA2 is the second contact area, N2 is a number of the plurality of second fins distributed in the second subarea, D2 is a diameter of each of the plurality of second fins, and Z1 is a height of each of the plurality of second fins.

19. The battery module of claim 11, wherein the cold plate further comprises:
an inlet header configured to receive a fluid coolant;
a top plane;
a bottom plane, wherein a fluid space is formed between the top plane and the bottom plane, and the fluid space is configured to contain the fluid coolant;
an outlet header configured to output the fluid coolant;
wherein the plurality of first fins and the plurality of second fins are connected between the top plane and the bottom plane,
wherein projections of the second subarea and the plurality of busbars onto a plane are overlapped, and projections of the first subarea and the plurality of busbars onto the plane are not overlapped.

20. The battery module of claim 11, further comprising:
a thermal conductive silicone pad placed between the cold plate and the plurality of busbars, and configured to provide insulation and dissipation between the cold plate and the plurality of busbars.

* * * * *